(12) United States Patent
Keller et al.

(10) Patent No.: US 9,161,268 B2
(45) Date of Patent: Oct. 13, 2015

(54) TECHNIQUE FOR CONNECTION ATTEMPT HANDLING IN A CIRCUIT SWITCHED FALLBACK SITUATION

(75) Inventors: Ralf Keller, Würselen (DE); Joerg Ewert, Aachen (DE); Karl-Peter Ranke, Herzogenrath (DE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 113 days.

(21) Appl. No.: 13/876,092

(22) PCT Filed: Jun. 22, 2011

(86) PCT No.: PCT/EP2011/003100
§ 371 (c)(1),
(2), (4) Date: Jun. 6, 2013

(87) PCT Pub. No.: WO2012/045377
PCT Pub. Date: Apr. 12, 2012

(65) Prior Publication Data
US 2013/0259001 A1    Oct. 3, 2013

Related U.S. Application Data

(60) Provisional application No. 61/389,856, filed on Oct. 5, 2010.

(30) Foreign Application Priority Data

Feb. 23, 2011  (EP) .................................... 11001510
May 23, 2011  (EP) ................... PCT/EP2011/002557

(51) Int. Cl.
*H04W 4/00*        (2009.01)
*G06F 11/00*      (2006.01)
(Continued)

(52) U.S. Cl.
CPC ........ *H04W 36/0022* (2013.01); *H04W 76/027* (2013.01)

(58) Field of Classification Search
USPC .................................. 370/331, 332, 216, 241
See application file for complete search history.

(56) References Cited

U.S. PATENT DOCUMENTS

2006/0274661 A1*  12/2006  Drum et al. ................... 370/241
2008/0144579 A1*   6/2008  Sood ............................. 370/332
2011/0216645 A1*   9/2011  Song et al. .................... 370/216

FOREIGN PATENT DOCUMENTS

EP       2099239 A1    9/2009
WO   2008033951 A2    3/2008

OTHER PUBLICATIONS

3rd Generation Partnership Project, "3rd Generation Partnership Project; Technical Specification Group Core Network and Terminals; Basic call handling;Technical realization (Release 9)", Technical Specification, 3GPP TS 23.018 V9.2.0, Sep. 1, 2010, pp. 1-285, Release 9, 3GPP, France.
(Continued)

*Primary Examiner* — Kiet G Tang
(74) *Attorney, Agent, or Firm* — Coats & Bennett, PLLC

(57) ABSTRACT

A technique for handling mobile terminating connection attempts for a mobile terminal for which a change of an association from a first routing node to a second routing node is accompanied by a Circuit Switched (CS) fallback is described. A method implementation of this technique comprises the following steps carried out by the first routing node: receiving a first mobile terminating connection attempt to the mobile terminal, in response to receipt of the first mobile terminating connection attempt, determining that the mobile terminal cannot be reached by the first routing node, determining an identity of the second routing node, and transmitting, to the second routing node, a second mobile terminating connection attempt for a CS connection to the mobile terminal.

31 Claims, 6 Drawing Sheets

(51) Int. Cl.
  *H04L 12/26*   (2006.01)
  *H04W 36/00*   (2009.01)
  *H04W 76/02*   (2009.01)

(56) References Cited

OTHER PUBLICATIONS

Alcatel-Lucent et al., "Mobile Terminating Roaming Forwarding", 3GPP TSG CT4 Meeting #52, Salt Lake City, US, Change Request, Feb. 21, 2011, pp. 1-25, C4-110738, Revision of C4-110487, 3GPP.

Alcatel-Lucent et al., "Mobile Terminating Roaming Forwarding", 3GPP TSG CT4 Meeting #52, Salt Lake City, US, Change Request, Feb. 21, 2011, pp. 1-5, C4-110758, Revision of C4-110738, 3GPP.

3rd Generation Partnership Project, "3rd Generation Partnership Project; Technical Specification Group Core Network and Terminals; Mobile Application Part (MAP) specification (Release 9)", Technical Specification, 3GPP TS 29.002 V9.3.0, Sep. 1, 2010, pp. 1-938, Release 9, 3GPP, France.

3rd Generation Partnership Project, "3rd Generation Partnership Project; Technical Specification Group Services and System Aspects; Circuit Switched (CS) fallback in Evolved Packet System (EPS); Stage 2 (Release 10)", Technical Specification, 3GPP TS 23.272 V10.2.1, Jan. 1, 2011, pp. 1-79, Release 10, 3GPP, France.

3rd Generation Partnership Project, "3rd Generation Partnership Project; Technical Specification Group Services and System Aspects; Circuit Switched (CS) fallback in Evolved Packet System (EPS); Stage 2 (Release 9)", Technical Specification, 3GPP TS 23.272 V9.4.0, Jun. 1, 2010, pp. 1-71, Release 9, 3GPP, France.

Ericsson, et al. "CSFB for terminating calls; new mobile roaming forwarding service." 23.272 Change Request, 3GPP TSG SA WG2 Meeting #83, TD S2-11xxxx, Feb. 21-25, 2011, Salt Lake City, Utah, USA, pp. 1-6.

* cited by examiner

TECHNIQUE FOR CONNECTION ATTEMPT HANDLING IN A CIRCUIT SWITCHED FALLBACK SITUATION

TECHNICAL FIELD

The present disclosure generally relates to connection attempt handling in a Circuit Switched Fallback (CSFB) situation.

BACKGROUND

CSFB is a procedure for enabling to fallback from a first Radio Access Technology (RAT) such as the Evolved UMTS Terrestrial Radio Access Network (E-UTRAN) to a second RAT such as GSM EDGE RAN (GERAN)/UTRAN/1× for originated and terminated CS services (mainly for voice, but also for other services such as Unstructured Supplementary Service Data, or USSD).

CSFB is specified today in the $3^{rd}$ Generation Partnership Project (3GPP) Technical Specification (TS) 23.272 (see, e.g., V9.4.0 of June 2010). In brief, CSFB permits in an Evolved Packet System (EPS) the provision of voice and other CS domain services (such as services pertaining to USSD) by re-use of CS infrastructure when the UE is served by E-UTRAN. A CSFB-enabled UE, connected to E-UTRAN, may thus use $2^{nd}$ or $3^{rd}$ Generation (2G or 3G) technologies such as GERAN or UTRAN to connect to the CS domain.

FIG. 1 illustrates an exemplary scenario in which a CSFB-enabled UE connected to E-UTRAN (via the LTE-Uu interface) uses GERAN (via the Um interface) or UTRAN (via the Uu interface) to connect to the CS domain in a CSFB situation (see section 4 of 3GPP TS 23.272). CSFB signalling requires the SGs interface between a Mobility Management Entity (MME) associated with the UE and a Mobile Switching Centre Server (MSC-S). The MSC-S has to be CSFB-enabled, which basically means that the MSC-S will have to be capable of maintaining SGs associations towards the MME for EPS-attached UEs that have indicated to support CSFB. A Serving GPRS Support Node (SGSN) is coupled via the S3 interface to the MME and via the Gs interface to the MSC-S.

The SGs interface to the MSC-S is used for mobility management and paging procedures between EPS and the CS domain. CSFB for terminating calls is triggered by paging of the UE in E-UTRAN and can in certain situations lead to a Location Update with respect to GERAN or UTRAN (see FIG. 1).

3GPP TS 23.018 (see, e.g., V9.2.1 of October 2010) describes basic call handling mechanisms. An exemplary call handling mechanism for a terminating call to a so-called B subscriber is shown in FIG. 2 (see section 4.2 of 3GPP TS 23.018) for a roaming UE (also called Mobile Station, or MS). The roaming UE is located in a Visited Public Land Mobile Network (VPLMN).

As illustrated in FIG. 2, when a Gateway MSC of the called B subscriber (GMSCB, or simply GMSC) receives an ISDN User Part (ISUP) Initial Address Message (IAM) for a UE, it requests routeing information from the associated Home Location Register of the B subscriber (HLRB, or simply HLR). To this end, a Send Routing Info (SRI) message is sent to the HLR. Next, the HLR requests a roaming number (i.e., a Mobile Station Roaming Number, MSRN) from the Visitor Location Register currently associated with the B subscriber (VLRB, or simply VLR). In this regard, a Provide Roaming Number (PRN) message is transmitted to the VLR. In a further step the VLR returns the MSRN in a PRN Ack message to the HLR, which forwards the MSRN to the GMSC in a SRI Ack message. The GMSC uses the MSRN to construct an ISUP IAM, which is sent to the Visited MSC of the B subscriber (VMSCB, or simply VMSC).

Upon receipt of the IAM, the VMSC requests information to handle the incoming call from its associated VLR. If the VLR determines that the incoming call is allowed, it requests the VMSC to page the UE. In a next step, the VMSC pages the UE via a Base Station Subsystem associated with the B subscriber (BSSB) using radio interface signalling. In this context, the VMSC starts a local paging timer. When the UE responds, the VMSC informs the VLR in a Page Ack message thereof and stops the paging timer. Next, the VLR instructs the VMSC to connect the call in a Complete Call message, and the VMSC finally establishes a traffic channel to the UE.

The basic mechanism for handling a terminating call illustrated in FIG. 2 needs to be modified in certain CSFB scenarios (that involve the nodes illustrated in FIG. 1). Specifically, CSFB is only available in case E-UTRAN coverage (as defined by Tracking Areas, or TAs) is overlapped by either GERAN or UTRAN coverage (as defined by, for example, Location Areas, or LAs). A general problem results from the fact that there exists no 1:1 mapping between TAs and LAs.

As shown in FIG. 3, for a terminating call the lacking congruency between TAs and LAs may have the consequence that the UE, when falling back from E-UTRAN to GERAN or UTRAN, may land in a LA that is not controlled by the "old" MSC-S towards which the SGs interface association for the UE has been established by the MME. In such a case the "old" MSC-S will not be able to terminate the call. For this reason, a so-called Roaming Retry (RR) procedure is defined in section 5.2 of 3GPP TS 23.018 to allow that call termination is tried again by the GMSC towards the "new" MSC-S controlling the cell the UE is presently camping on.

The RR procedure suggested in section 5.2 of 3GPP TS 23.018 results in the requirement that all GMSCs have to be upgraded for RR support. Such an upgrade may be difficult for network operators having MSC-S and GMSC from different vendors because in practice every MSC-S may as well play the role of a GMSC, and hence all vendors have to provide RR support and all MSC-Ss have to be upgraded. For large countries such as the Republic of China or the USA hundreds of MSC-Ss thus require an update prior to launching CSFB. The fact that the GMSC is located in the home country of the subscriber while, when roaming, the serving MSC-S is located in a visited network further complicates the situation. In such a case RR support has to be coordinated among different network operators, often across international borders.

Thus, the CSFB procedure as standardized in current 3GPP TS 23.272 (see, e.g., V10.1.0) has the deployment problem that it requires that all MSCs serving a part of the geographical area where E-UTRAN is deployed will support the SGs interface to MME and the CSFB procedure. For initial deployments of E-UTRAN on top of an existing CS network it would, however, be desirable to enhance only a few MSCs in the network with the SGs interface and the CSFB functionality. It will be appreciated that similar problems may generally occur in other communication systems not compliant with TS 23.272.

SUMMARY

There is a need for an efficient CSFB technique.

According to a first aspect, a method of handling mobile terminating connection attempts for a mobile terminal for which a change of an association from a first routing node to a second routing node is accompanied by a CS fallback. The method comprises the following steps carried out by the first routing node: Receiving a first mobile terminating connection attempt (e.g., for a packet switched or any other non-CS connection such as an E-UTRAN connection) to the mobile terminal, in response to receipt of the first mobile terminating connection attempt, determining that the mobile terminal cannot be reached by the first routing node, determining an identity of the second routing node, and transmitting, to the second routing node, a second mobile terminating connection attempt for a CS connection to the mobile terminal. CS fallback may be realized, for example, by CSFB in accordance with 3GPP TS 23.272.

The identity of the second routing node may be given by a network address (of the second routing node). The network address may at least locally be unique.

The association between the mobile terminal and any of the routing nodes may be a registration. Accordingly, the mobile terminal may be registered in the first routing node. The registering may involve a dedicated interface to a mobility management node. The second routing node may lack such a dedicated interface. In one implementation (e.g., in a Long Term Evolution, or LTE, implementation), the dedicated interface is a SGs interface and the mobility management node is a Mobility Management Entity, or MME.

CS fallback support may be provided by the first routing node, optionally in combination with the mobility management node. As an example, a CS fallback procedure for the mobile terminal may involve a dialog between the first routing node and the mobility management entity (see, e.g., 3GPP CS 23.272 and similar specifications). The second routing node may lack CS fallback support for the mobile terminal.

The method may also comprise detecting, performing or triggering a CS fallback (or CS fallback procedure). Detecting, performing or triggering the CS fallback may result in or include a dialog with the mobility management entity via the dedicated interface. This dialog may be in accordance with 3GPP TS 23.272 or any other specification.

The CS fallback may be detected, performed or triggered based on one or more events, including:
  receipt of a location update notification or a location cancellation notification for the mobile terminal,
  determining that the mobile terminal cannot be reached, and
  receipt of a fallback notification or any other message from the second routing node.

Determining that the mobile terminal cannot be reached may comprise paging the mobile terminal and determining that no paging response is received from the mobile terminal. Alternatively, or in addition, determining that the mobile terminal cannot be reached may comprise receiving a location update notification or a location cancellation notification for the mobile terminal. Still further, or as another alternative, determining that the mobile terminal cannot be reached may comprise receiving an MAP Send_dentification message from the second routing node.

As stated above, detecting CS fallback on the one hand and determining that the mobile terminal cannot be reached on the other hand may be synonymous (i.e., may not involve two separate processes but one may imply the other). As an example, receipt of an MAP Send_Identification message may imply that the mobile terminal cannot be reached and at the same time permit detection of CS fallback.

The identity of the second routing route may be determined in various ways. As an example, the identity of the second routing node may be determined based on an information received by the first routing node from the second routing node. Such information may be included in an MAP Send_Identification message. The MAP Send_Identification message may comprise the identity of the second routing node. Thus, determining the identity of the second routing node may comprise using the identity of the second routing node comprised in the MAP Send_Identification message.

The first routing node may receive fallback information from the second routing node. The fallback information may be the MAP Send_Identification message per se. In other words, receipt of the MAP Send_Identification message may be interpreted by the first routing node as being indicative of a fallback to CS. Alternatively, the fallback information may be included as a data item in the MAP Send_Identification message.

Alternatively, or in addition, the identity of the second routing node may be determined based on a predefined association between the first routing node and the second routing node. The first routing node may thus have a priori knowledge of the identity of the second routing node. Additionally, or as an alternative, the identity of the second routing node may also be determined based on one or more area identifiers (such as TAI and/or ECGI) pertaining to a location of the mobile terminal. The one or more area identifiers may be received together with the first mobile terminating connection attempt. Moreover, the identity of the second routing node may be determined based on a predefined mapping between area identifiers on the one hand and second routing nodes on the other.

The method may further comprise requesting a roaming number for the mobile terminal from the second routing node once the identity of the second routing node has been determined. In this regard, a delay timer may be started in response to receipt of a location update notification or a location cancellation notification for the mobile terminal. The roaming number may then be requested once the delay timer has expired. The roaming number may be sent together with the second mobile terminating connection attempt (or separate therefrom) to the second routing node.

The first mobile terminating connection attempt may be received for a non-CS connection to the mobile terminal. As an example, the first mobile terminating connection attempt may be for a Packet Switched (PS) or any other non-CS connection (such as an E-UTRAN connection). The first mobile terminating connection attempt may be based on an SGs interface association (where it is assumed that the mobile terminal has a non-CS connection as it is, for example, camping on LTE) and the second mobile terminating connection attempt may be based on a A or Iu-CS interface association (where it may be known that the mobile terminal has a CS connection; see FIG. 1).

According to another aspect, a method of handling a mobile terminating connection attempt for a mobile terminal for which a change of an association from a first routing node to a second routing node is accompanied by CS fallback is provided. The method is carried out by the second routing node and comprises the steps of sending, to the first routing node, information enabling the first routing node to determine an identity of the second routing node, and receiving, from the first routing node, a mobile terminating connection attempt for a CS connection to the mobile terminal.

The information enabling the first routing node to determine the identity of the second routing node may be sent in a MAP Send_Identification message. The MAP Send_Identification message may be provided based on information received in a location update for the mobile terminal containing the identity of the first routing node.

The second routing node may further send fallback information to the first routing node. The fallback information may be the MAP Send_Identification message (e.g., the MAP Send_Identification message per se or any data item included in the MAP Send_Identification message).

The first routing node and the second routing node may be configured in various ways. As an example, the first routing node and the second routing node may each be configured as an MSC or an MSC-S.

The technique presented herein may be realized in the form of software, in the form of hardware, or using a combined software/hardware approach. As regards a software aspect, a computer program product comprising program code portions for performing the steps presented herein when the computer program product is executed on a computing device is provided. The computer program product may be stored on a computer-readable recording medium such as a memory chip, a CD-ROM, a hard disk, and so on. Moreover, the computer program product may be provided for download via a network connection onto such a recording medium.

According to a still further aspect, a routing node for handling mobile terminating connecting attempts for a mobile terminal for which a change of an association from the routing node to another routing node is accompanied by a CS fallback is provided. The routing node comprises a first interface adapted to receive a first mobile terminating connection attempt (e.g., for a non-CS connection such as an E-UTRAN connection) to the mobile terminal, a processor adapted to determine, in response to receipt of the first mobile terminating connection attempt, that the mobile terminal cannot be reached by the first routing node and further adapted to determine an identity of the other routing node, and a second interface adapted to transmit, to the other routing node, a second mobile terminating connection attempt for a CS connection to the mobile terminal. The first interface and the second interface may be implemented as a single interface or as two different interfaces.

The routing node (e.g., its processor) may further be adapted to perform the steps of any of the method aspects discussed herein.

The routing node may be adapted to determine the identity of the other routing node based on information received by the routing node from the other routing node. As an example, the routing node may be adapted to determine the identity of the other routing node based on an MAP Send_Identification message.

Still further, the routing node may be adapted to receive fallback information from the other routing node. The fallback information may be the MAP Send_Identification message.

According to a still further aspect, a routing node for handling mobile terminating connection attempts for a mobile terminal for which a change of an association from another routing node to the routing node is accompanied by a CS fallback is provided. The routing node comprises a component adapted to send, to the other routing node, information enabling the other routing node to determine an identity of the routing node, and another component adapted to receive, from the other routing node, a mobile terminating connection attempt for a CS connection to the mobile terminal.

The above routing node may be adapted to send the information in an MAP Send_Identification message. The MAP Send_Identification message may be provided based on information received in a location update for the mobile terminal containing the identity of the other routing node.

The routing node may be further adapted to send fallback information to the other routing node. The fallback information may be the MAP Send_Identification message.

Also provided is a network system comprising the first routing node and the second routing node, wherein an association for the mobile terminal is changed from the first routing node to the second routing node in a CS fallback situation. The network system may be configured to support the LTE (including LTE-Advanced) standard.

BRIEF DESCRIPTION OF THE DRAWINGS

Further aspects, advantages and details of the technique presented herein will be discussed in more detail with reference to exemplary embodiments and the drawings, wherein.

DETAILED DESCRIPTION

In the following description of exemplary embodiments, for purposes of explanation and not limitation, specific details are set forth such as specific sequences of signalling steps in order to provide a thorough understanding of the technique presented herein. It will be apparent to one skilled in the art that the technique may also be practised in other embodiments that depart from these specific details. For example, while the following embodiments will be described with specific refererence to LTE, it will be appreciated that the technique presented herein can also be implemented in other communication networks in which a fallback to a CS mode can occur.

Moreover, those skilled in the art will appreciate that the services, functions and steps explained herein below may be implemented using software functioning in conjunction with a programmed micro processor, an Application Specific Integrated Circuit (ASIC), a Digital Signal Processor (DSP) or a general purposes computer. It will also be appreciated that while the following embodiments will primarily be described in the context of methods and devices, the technique presented herein may also be embodied in a computer program product as well as in a system comprising a computer processor and a memory coupled to the processor, wherein the memory is encoded with one or more programs that may be perform the services, functions and steps disclosed herein.

Figure 1:
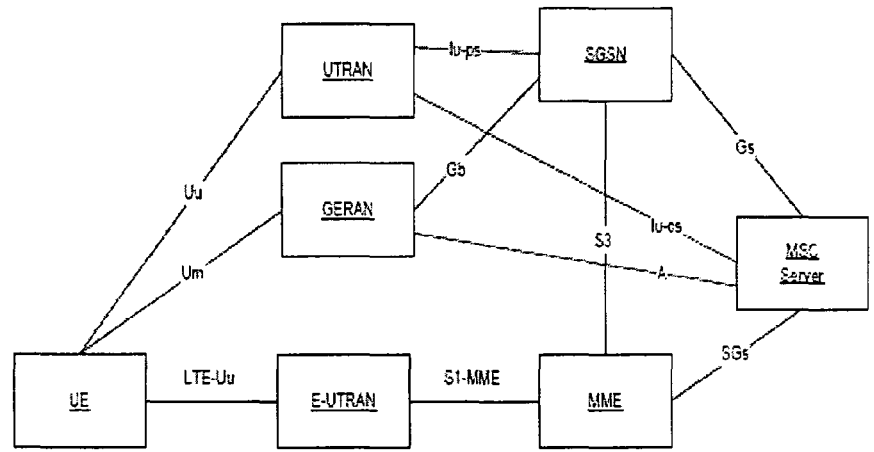
FIG. 1 illustrates the components involved in a CSFB situation.
Figure 2:
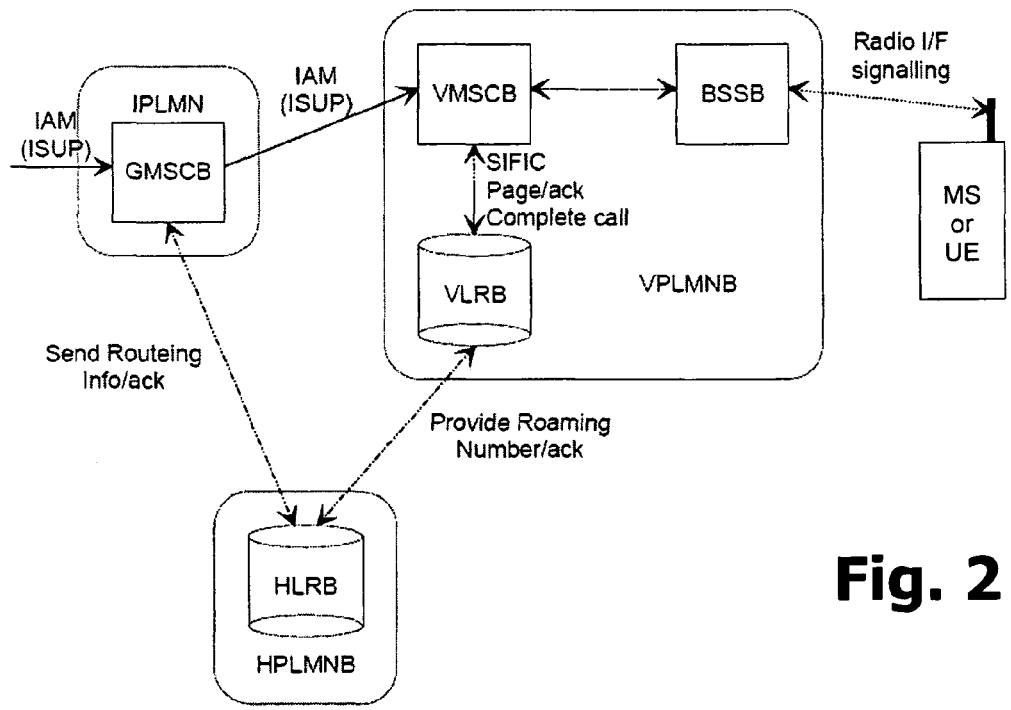
FIG. 2 illustrates a basic call handling mechanism for a terminating call.
Figure 3:
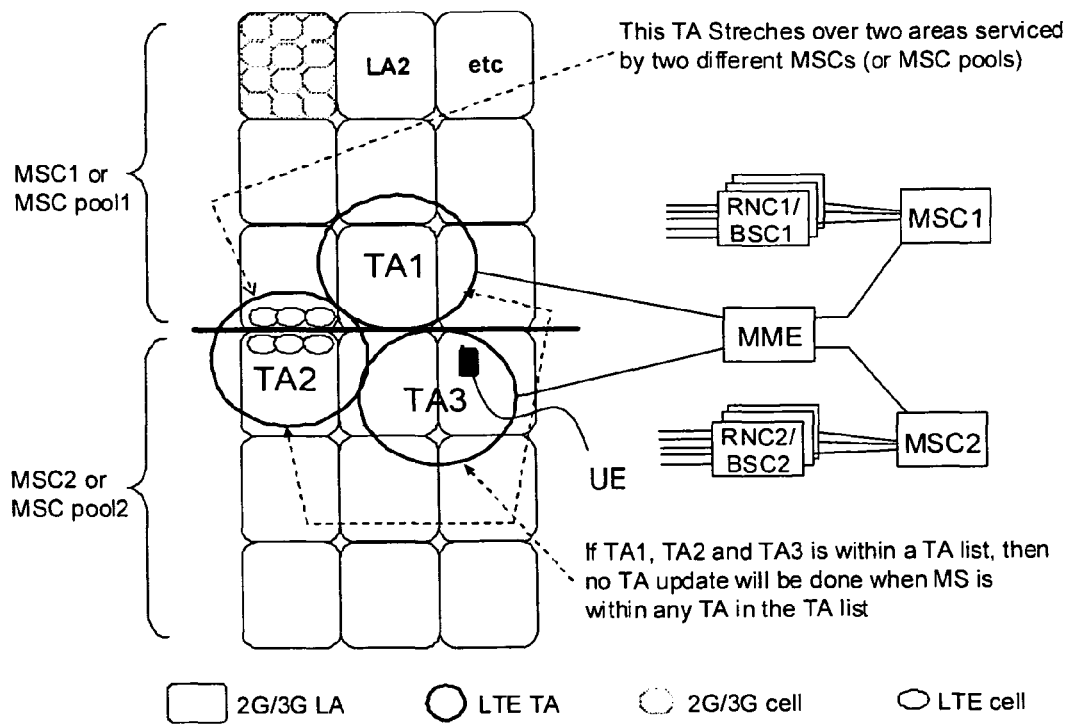
FIG. 3 illustrates the lacking congruency between Tracking Areas on the one hand and Location Areas on the other.

The embodiments presented hereinafter are generally directed to setting up a terminating call to a UE in a CSFB situation. Accordingly, the embodiments will typically involve the types of network nodes schematically illustrated in FIGS. 1 and 2. The embodiments target at resolving the problems that may result from a lacking congruency between TAs and LAs in a CSFB situation (as illustrated in FIG. 3) without necessarily having an impact on the GMSC and without necessarily requiring an update of all MSCs in the network. To this end, an "enhanced" RR procedure is proposed.

According to the following embodiments, a dedicated routing or control node (called CSFB Gw-MSC hereinafter) is introduced that handles the interface association (e.g., for SGs) to the mobility management node (e.g, an MME) and ensures that mobile originated and terminating calls for mobile terminals (such as UEs being CSFB enabled and/or having a CSFB subscription) can be established without requiring to implement the corresponding interface in the other routing or control nodes (such as MSCs) of the network potentially or actually serving the mobile terminal.

Figure 4:
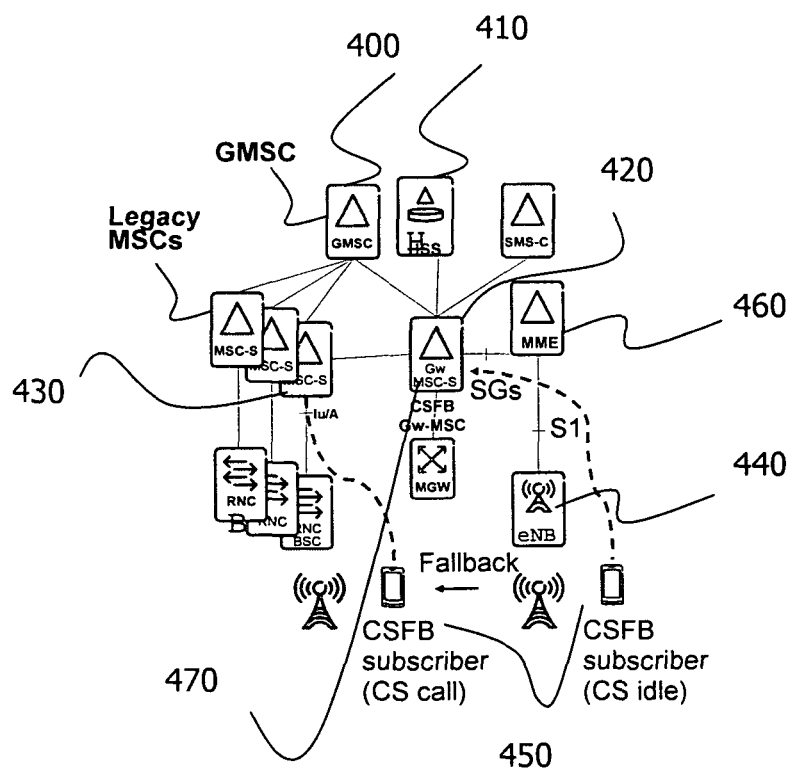
FIG. 4 illustrates an embodiment of a communication network in a CSFB situation.

FIG. 4 (which corresponds to FIG. 1 but highlights other details) exemplarily illustrates components of a communication network embodiment comprising 2G/3G cells/RAT support (e.g., GERAN/UTRAN/1×) as well as 4G cells/RAT support (e.g., E-UTRAN). At call setup, a UE 450 being CSFB enabled and/or having a CSFB subscription may perform Location Update to a target (legacy) MSC 430 because it is camping on a 2G/3G cell not served by a CSFB Gw-MSC 420 having the SGsassociation (for the UE 450) to an MME 460, hence mobile originated and terminated calls need to be established via the target MSC 430. As understood in the context of the following embodiments, the term MSC covers both Mobile Switching Centers and Mobile Switching Center Servers.

As mentioned above, the MSC where the UE 450 is registered when roaming in E-UTRAN access is called CSFB Gw-MSC 420. The UE 450 is registered in that MSC 420 via the SGs interface, as described in TS 23.272. The MSC where the UE 450 is performing Location Update at call setup, after CS fallback has happened, is called target MSC-S 430 (or simply target MSC). The target MSC 430 may be a legacy MSC that does not support the SGs interface and CS fallback procedures. In an alternative realization, the target MSC 430 may be configured to provide CSFB support.

Figure 5:
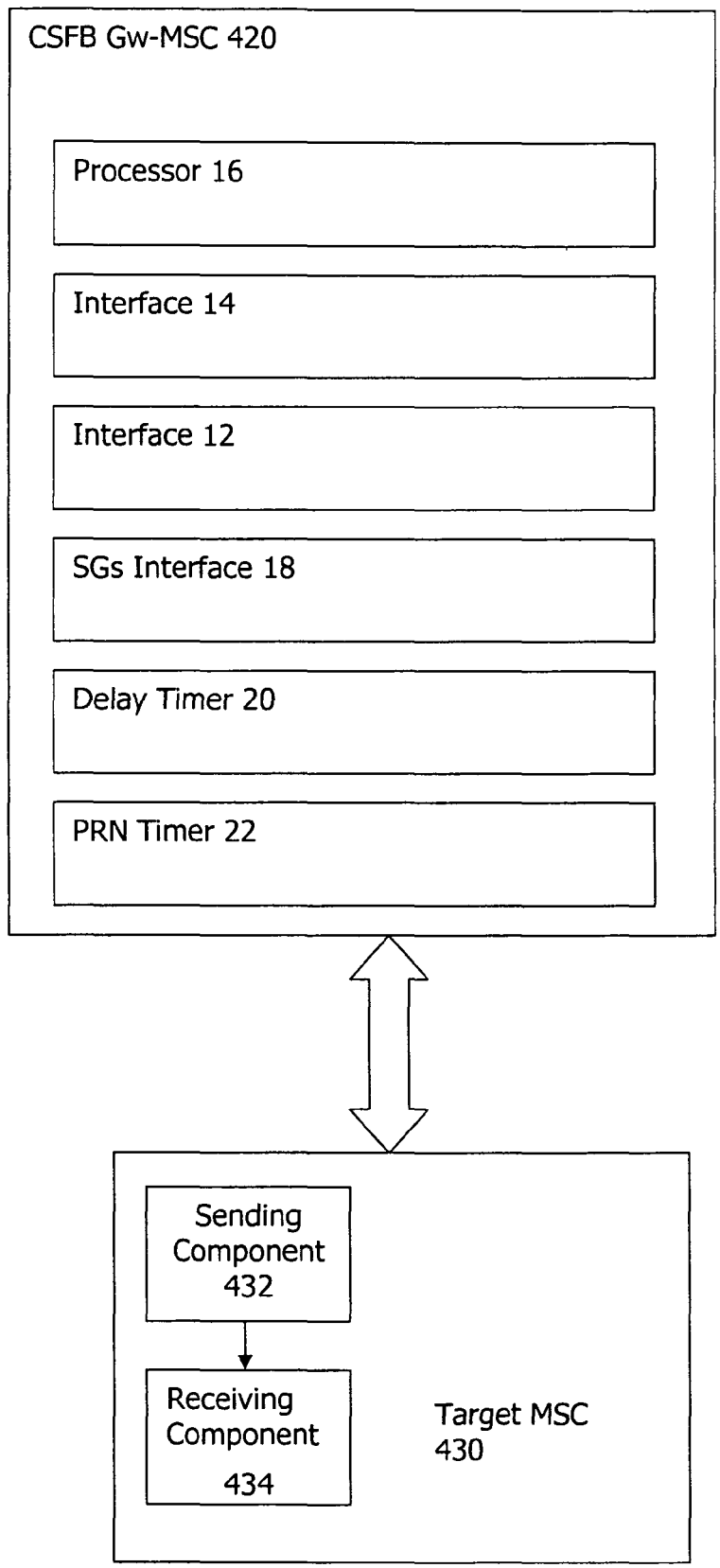
FIG. 5 illustrates two routing node embodiments.

FIG. 5 illustrates in more detail embodiments of the CSFB Gw-MSC 420 and the target MSC 430. As shown in FIG. 5, the CSFB Gw-MSC 10 comprises a first interface 12 for receiving mobile terminating connection attempts (such as IAMs from the GMSC 400 illustrated in FIG. 4), a second interface 14 adapted to transmit, to the target MSC 430, mobile terminating connection attempts for a CS connection to the UE 450, and a processor 16 adapted to determine, in response to receipt of a mobile terminating connection attempt from the GMSC 400, that the UE 450 cannot be reached by (or via) the CSFB Gw-MSC 420 and further adapted to determine an identity (e.g., a network address) of the target MSC 430 presently associated with the UE 450. The CSFB Gw-MSC 420 further comprises an optional SGs interface 18 to the MME 460 (not depicted in FIG. 5, but illustrated in FIG. 4). Via the SGs interface 18, TAI and/or E-CGI information may be received from the MME 460. Additionally, the SGs interface 18 may be involved in a CSFB dialog between the CSFB Gw-MSC 420 and the MME 460.

As illustrated in FIG. 5, and as a further option, the CSFB Gw-MSC 420 further comprises a delay timer 20 as well as a PRN timer 22. Both timers 20, 22 will be described in more detail below.

The target MSC 430 shown in FIG. 5 comprises a sending component 432 as well as a receiving component 434. The components 432, 434 may be implemented as one or more suitable interfaces.

The sending component 432 of the target MSC 430 is adapted to send, to the CSFB Gw-MSC 420, information enabling the CSFB Gw-MSC 420 to determine an identity of the target MSC 430. The receiving component 434 is adapted to receive, from the CSFB Gw-MSC 420, a mobile terminating connection attempt for a CS connection to UE 450.

Figure 6:
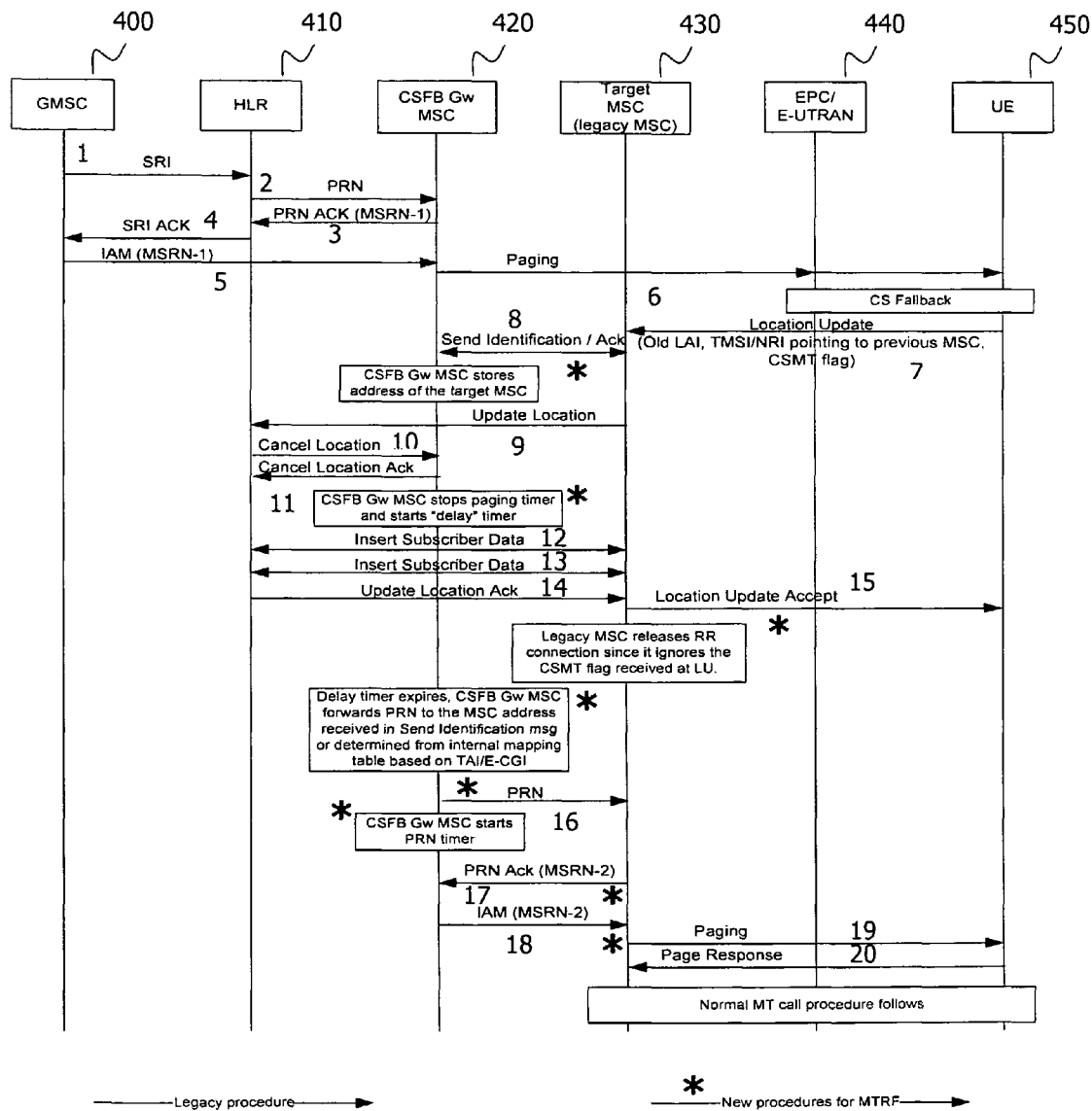
FIG. 6 illustrates an embodiment of a signalling diagram in a CSFB situation.

Before explaining further details of the enhanced RR procedure presented herein with reference to the signaling diagram of FIG. 6, various general aspects of this procedure are now described in more detail. It will be appreciated that the aspects may be implemented jointly or individually as needed.

As for the general concept of the CS Fallback Gateway, the CSFB Gw-MSC 420 with CSFB/SMSoSGs capability is added for CSFB/SMSoSGs subscribers (UEs 450). The CSFB Gw-MSC 420 has an SGs interface to the MME 460. The MME 460 may decide that CSFB shall only be performed to 3G or 2G.

As illustrated in FIG. 4, the RAN 440 routes CSFB subscribers (UEs 450) to legacy MSCs 430 (CSFB Gw-MSC 420 has no RAN configured). Thus, the CSFB UE 450 has to perform LAU.

For an originated call, the UE 450 establishes the originated call according to 3GPP TS 23.272 (including LAU). For a terminated call, the CSFB Gw-MSC 420 can act as relay (i.e., routing) node. When the CSFB Gw-MSC 420 receives MAP Cancel Location from HLR 410 (possibly after a timeout), or upon any other event (such as detecting a CS fallback), the CSFB Gw-MSC 420 determines the (identity of) the target MSC 430 according to one or more of the following strategies:

simple 1:1 relationship CSFB Gw-MSC 420/target MSC 430, and/or based on information received via SGs (TAI, E-CGI), and a mapping table in the CSFB Gw-MSC 420 from TAI and/or E-CGI to target MSC 430, and/or based on information received via MAP_Send-Indentification message from target MSC 320.

The CSFB Gw-MSC 420 sends PRN to target MSC 430 and then forwards connection attempt (IAM) to target MSC 430. The UE 450 may be paged a second time (first time paging may occur via CSFB Gw-MSC 420, see FIG. 4), now from the target MSC 439 via A/Iu-interface (see FIG. 1). The UE 450 then accepts the terminating call.

If, as indicated above, the target MSC 430 sends an MAP-Send_Identification message to the CSFB Gw-MSC 420 (the address may, for example, be derived from the previous Location Area provided by UE 450 in a Location Update message or otherwise), then the signaling procedure illustrated in FIG. 6 may be used. If the MAP Send_identification procedure is not used, then the CSFB Gw-MSC 420 may use the TAI and/or E-CGI provided via the SGs interface to look up the MSC address of the target MSC 430 in a mapping table. This approach requires that such a mapping is possible. A table entry can also include more than one MSC address; in this case the CSFB Gw-MSC 420 tries to contact all the listed MSCs. The remaining signaling can be performed as shown in FIG. 6.

As an alternative to the above, the CSFB Gw-MSC 420 can be associated with one specific target MSC 420 (i.e., one CSFB Gw MSC 420 contacts for all CSFB subscribers, or UEs 450, always the same target MSC 430). The remaining signaling can be performed as shown in FIG. 6.

In the MSC address determination scenario illustrated in FIG. 6 and in other MSC address determination scenarios, the CSFB Gw-MSC 420 may optionally start a configurable delay timer (reference numeral 20 in FIG. 4) when the MAP Cancel Location message is received during an ongoing paging for a mobile terminating call via the SGs interface. The CSFB Gw-MSC 420 will only forward the PRN information received from the HLR 410 to the target MSC 430 after this delay timer 20 has expired in order to avoid that the PRN information is received in the target MSC 430 while the Location Update procedure is still ongoing in the target MSC 430.

Alternatively, or in addition, the CSFB Gw MSC 420 may start a (standard) MAP timer (reference numeral 22 in FIG. 3) when sending PRN in order to supervise the reception of PRN Response that contains the MSRN allocated by the target MSC 430. At reception of the PRN Response the CSFB Gw MSC 420 will forward the IAM received from GMSC 400 to the target MSC 430, using that MSRN.

As illustrated in FIGS. 4 and 6, a connection attempt started with the fallback trigger is discontinued and a new paging is done to restart the connection attempt in CS.

Referring now to the signalling diagram of FIG. 6, the network nodes potentially involved in the technique presented herein are shown in the upper portion. Specifically, a typical network environment as illustrated in FIG. 4 in which the enhanced RR procedure can be practised will comprise the GMSC 400, the HLR 410, the CSFB Gw MSC (or MSC-S) 420 with an associated VLR as shown in FIG. 2, the target MSC (or MSC-S) 430 with an associated VLR as shown in FIG. 2, an Evolved Packet Core (EPC)/E-UTRAN 440 as well as at least one UE 450. Also present but no specifically illustrated in FIG. 6 is the MME 460.

The CSFB Gw MSC 420 will in the following also be called "old" MSC 420 as it is the MSC where the UE 450 was initially registered (i.e., before CSFB has happened). The target MSC 430 will in the following also be referred to as the "new" MSC 430 as it is the MSC where the UE 450 is performing Location Update after the CSFB.

The basic concept of the signalling embodiment that will be described with reference to FIG. 6 is that in case of CSFB and a terminating call, when the UE 450 has to perform a Location Update procedure to the target MSC 430 because it is camping on a 2G/3G cell not served by the CSFB Gw-MSC 420 (that has the SGs association for the UE 450 to the MME 460), then the target MSC 430 will trigger the enhanced RR procedure to the CSFB Gw-MSC 420.

Figure 7:
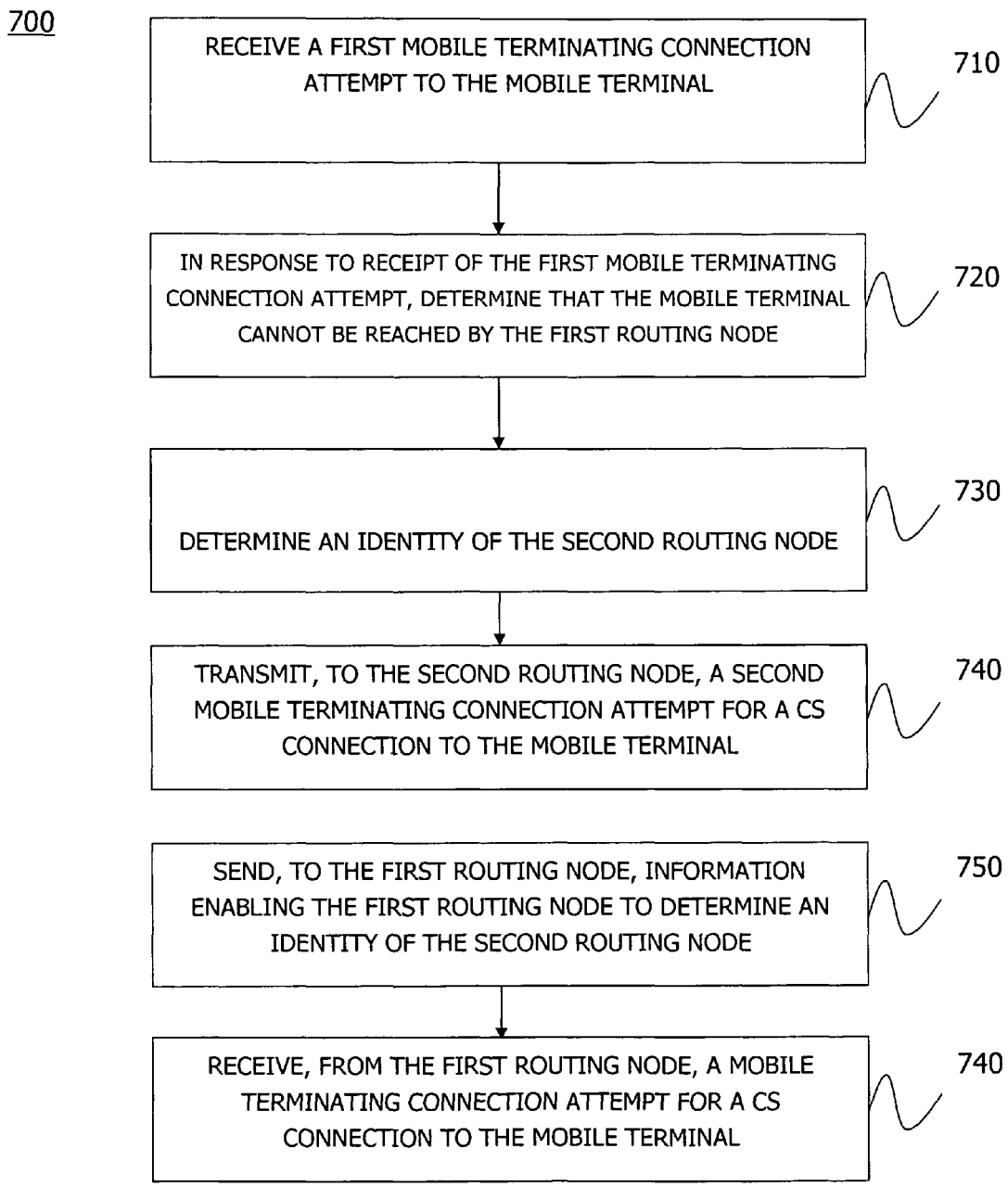
FIG. 7 is a flow diagram illustrating two method embodiments.

The operation of the CSFB Gw-MSC 420 and the target MSC 430 will now be described in more detail with reference to the signalling diagram of FIG. 6 and the flow diagram 700 of FIG. 7. It will be appreciated that when referring to the CSFB Gw-MSC 420 in this and other contexts, the VLR associated with the CSFB Gw-MSC 420 can also be meant (see, e.g., FIG. 2 and section 10.2.1 of 3GPP TS 29.002 with respect to details of the). Similar considerations apply with respect to the target MSC 430 and its associated VLR.

Signalling steps 1 to 6 have already been described above with reference to FIG. 2 and will therefore not be discussed in particular detail. It is important, however, to note that in signalling step 5 the CSFB Gw-MSC 420 receives via the interface 12 an IAM message from the GMSC 400 for the UE 450. The IAM message relates to a mobile terminating connection attempt (i.e., a call attempt) to the UE 450. Signalling step 5 thus corresponds to step 710 in FIG. 7. When paging the UE 450 via the EPC/E-UTRAN 440 responsive to receipt of the IAM message, the CSFB Gw-MSC 420, the CSFB Gw-MSC 420 will receive no paging response from the UE 450 as the UE 450 has moved to and is presently camping on a 2G/3G cell not controlled by the CSFB Gw-MSC 420.

In response to receipt of the paging message from the CSFB Gw-MSC 420, the CSFB procedure (as illustrated in FIG. 6 by a box connecting UE 450 and EPC/E-UTRAN 440) will be initiated by the EPC/E-UTRAN 440. In this context, the UE 450 provides a Location Update message towards the target MSC 430 controlling the 2G/3G cell the UE 450 is presently camping on (signalling step 7 in FIG. 6). The Location Update message includes the old LAI, the Temporary Mobile Subscriber Identity (TMSI)/Network Resource Identifier (NRI) to the CSFB Gw-MSC 420, as well as a Circuit Switched Mobile Terminating (CSMT) flag. The CSMT flag indicates to the target MSC 430 that the Location Update is due to a CSFB Mobile Terminating (MT) call and triggers the enhanced RR procedure. In an embodiment in which the target MSC 430 does not support CSFB, the CSMT flag is simply ignored by the target MSC.

As part of the enhanced RR procedure, the target MSC 430 sends in signalling step 8 an MAP Send_Identification message to the CSFB Gw-MSC 420. In the present embodiment, the MAP Send_Identification message prevents the CSFB Gw-MSC 420 to assume or determine that call termination has failed. Moreover, the MAP Send_Identification message sent by the target MSC 430 enables the CSFB Gw-MSC 420 to determine the identity of the target MSC 430 (step 750 in FIG. 7). The target MSC 430 derives the address of the CSFB Gw-MSC 420, based on the old Location Area Identifier (LAI) received from the UE 450 during the Location Update procedure.

The MAP Send_Identification message is interpreted by the CSF Gw-MSC 420 as indication that the UE 450 cannot be reached by the CSFB Gw-MSC 420. As has been explained above, the MAP Send_Identification message is received in a causal relationship with receipt of the IAM message by the CSFB Gw-MSC 420 in signaling step 5 and the resulting paging procedure. 3GPP TS 23.272 (see Chapter 7.3, Step 4a as well as Chapter 5.1A) explains the relationship between the paging procedure and the resulting Location Update in the target MSC 430. As stated above, the Location Update procedure, in turn, may in certain situations trigger transmission of the MAP Send_Identification message by the target MSC 430 to the CSFB Gw-MSC 420.

The MAP Send_Identification message received by the CSFB Gw-MSC 420 from the target MSC 430 comprises the identity (i.e., address) of the target MSC 430. In accordance with step 730 of FIG. 7, the CSFB Gw-MSC 420 is thus enabled to determine the identity of the target MSC 430. The CSFB Gw-MSC 420 stores the address of the target MSC 430 locally for later use.

In response to receipt of the Location Update message, the target MSC 430 initiates standard procedures for Location Update (see signalling steps 9 to 15 in FIG. 4). The target MSC 430 receives the subscriber data from the HLR 410 (signalling steps 12 and 13) and acknowledges the Location Update to the UE 450 (signalling step 15). In case the target MSC 430 should not support CSFB ("legacy MSC") it releases the RR connection (i.e., the signalliIng connection to the UE 450) since it ignores the CSMT flag reveived with the Location Update message in signalling step 7 (see box in FIG. 6). The release of the RR connection requires a re-establishment thereof, which would take additional time.

When the CSFB Gw-MSC 420 receives a Cancel Location message in signalling step 10 (and acknowledges same in signalling step 11), it stops the paging timer (that has been started earlier upon paging the UE 450 in signalling step 6) and starts the delay timer 20 (see FIG. 5). It does so because the CSFB Gw-MSC 420 has the SGs association to the MME 460 (see FIG. 1) for the UE 450. Hence, the CSFB Gw-MSC 420 knows that the UE 450 is camping on E-UTRAN and that it has paged the UE 450. The CSFB Gw-MSC 420 keeps the subscriber data (including the PRN information received in signalling step 2) in the VLR until the delay timer 20 expires.

Upon expiry of the delay timer 20, the CSFB Gw-MSC 420 forwards the PRN information received in signalling step 2 from the HLR 410 (i.e., at the PRN procedure) towards the target MSC 430 in a further signalling step 16. It is noted that the forwarding of the information received at PRN is needed since otherwise the target MSC 430 is not getting this information (and in particular not from the GMSC 400). Receipt of the PRN information is acknowledged in signalling step 17 to the CSFB Gw-MSC 420. The acknowledgement message includes the MSRN assigned by the target MSC 430 to the UE 450.

As for the PRN operation and the content (i.e., the PRN information) communicated thereby, reference is made to section 10.2 of 3GPP TS 29.002, which describes the MAP_PROVIDE_ROAMING_NUMBER service. This service is used between the HLR 410 and the VLR associated with the CSFB Gw-MSC 420. The service is invoked by the HLR 410 to request that VLR to send back the MSRN to enable the HLR 410 to instruct the GMSC 400 to route an incoming call to the called UE 450 as has been discussed above with reference to FIG. 2. The service is a confirmed service which uses the primitives described in table 10.2/1 of 3GPP TS 29.002. Specifically, at least the following service primitives (MAP_PROVIDE_ROAMING_NUMBER parameters or "PRN information") are defined:

Invoke Id
IMSI
MSC Number
MSISDN
LMSI
GSM Bearer Capability
Network Signal Info
Suppression Of Announcement
Call Reference Number
GMSC Address
OR Interrogation (not applicable)
OR Not Supported in GMSC (not applicable)
Alerting Pattern
CCBS Call
Supported CAMEL Phases in interrogating node (not applicable)
Additional Signal Info
Pre-paging supported (not applicable)
Long FTN Supported
Suppress VT-CSI
Offered CAMEL 4 CSIs in interrogating node (not applicable)
MT Roaming Retry Supported (not applicable)
Paging Area
Call Priority In a further signalling step 18, the CSFB Gw-MSC 420 forwards the call set up request (i.e., in the present embodiment an IAM message according to ISUP or, in alternative embodiments, an INVITE message according to SIP) to the target MSC 430. The call set up request transmitted by the CSFB Gw-MSC 420 corresponds to a mobile terminating connection attempt for a CS connection to the UE 450 (in accordance with step 740 in FIG. 7). The call set up request includes the MSRN assigned by the target MSC 430 to the UE 450.

In response to receipt of the call set up request message in signalling step 18 (in accordance with step 760 in FIG. 7), the target MSC 430 continues the terminating call set up procedure. Specifically, the the target MSC 430 handles call set up to UE 450 in accordance with the PRN information. Call set up includes the transmission of a paging message to the UE 450 in signalling step 19 and the receipt of a corresponding response message in signalling step 20 (see FIG. 6).

In the following, a few examples will be presented for handling call set up by the target MSC 430 in accordance with the PRN information based on the parameters listed above. The GSM Bearer Capability parameter, for instance, informs the target MSC 430 whether the particular call is a voice or a video call. Accordingly, the target MSC 430 either applies voice call handling or video call handling depending on the content of the GSM Bearer Capability parameter. As another example, the Call Priority parameter informs the target MSC 430 whether priority handling shall be applied to the call that is to be set up to the UE 450. It should be noted that call set up handling by the target MSC 430 in accordance with the PRN information follows the standard procedures and will thus not be described in more detail herein.

The technique presented herein and exemplarily illustrated in the drawings is generally suitable for a network system or communication network comprising a first access, control or routing node (CSFB Gw-MSC 420), a second access, control or routing node (target MSC 430) and a mobile terminal (UE 450) capable of connecting via either LTE (4G) or CS (2G or 3G) RAN. The technique may in one embodiment, that may be combined with any other of the embodiments described herein, involve one or more of the following steps:

receiving a mobile terminating connection attempt (IAM (MSRN-1)) by the first node (signaling step 5 in FIG. 6), starting a first connection attempt (e.g., by means of paging) to the mobile terminal including triggering or detecting fallback to CS (signaling step 6 in FIG. 6), receiving by the second node a location update from the mobile terminal indicating fallback to CS and the identity of the first access node (signaling step 7 in FIG. 6), sending by the second node information (MAP Send_Identification message) permitting the first node to determine the identity of the second node (signaling step 8 in FIG. 6), determining by the first node the identity of the second node (based on the information received in signaling step 8), handling of the rerouting as CS connection by the first node (not illustrated in FIG. 6, can be the dialog with the MME as provided in the standard such as 3GPP TS 23.272), sending a mobile terminating CS connection attempt (IAM (MSRN-2)) to the second node (signaling step 18 in FIG. 6), and starting a second connection attempt (by means of paging) to the mobile terminal by the second node (signaling step 19 in FIG. 6).

As discussed above, there are various options to accomplish the step of determining the identity of the second node. The Target MSC can be configured to provide a MAP-SI based on the information in the location update received containing the identity of the first node/previous MSC.

Option 1:
The second node sends a MAP-SI (Send Identification) and so the first node knows the identity of the second node. This option is generally useable also for MSC in pools.

Option 2:
The second node does not send the MAP-SI. The first node uses an internal mapping table using known TAI/E-CGI from the first connection attempt to select the appropriate MSC for that area. In this case the MSCs are fixed assigned to areas and a flexible pool concept cannot be used.

An extra clarification to the target MSC may be provided here. As it is not SGs enabled, it will not recognize the CMST flag. It will therefore not start a connection hold/location update in progress timer but instead release the connection attempt as it has no incoming terminating call attempt associated.

Accordingly, for the above options, the technique may generally involve one or more of the following further or alternative steps (see also FIG. 4):

sending by the second node fallback information to first node (the fallback information may, e.g., be a MAP Send Identification message comprising the identity of the second access node)

the determining step above may further comprise using the identity of the second access node comprised in the MAP Send Identification Message and/or the first access node may have a mapping table comprising allocations of second access node identifications to TAI/E-CGI area identifiers and assigns an identity of a second node based on said table and the TAI/E-CGI area identifiers received in said mobile terminating connection attempt.

For USSD also a basic terminating call attempt can be made only without setting up a bearer for a voice channel as the USSD information is already included in the signaling.

In addition to TS 23.272, TS 23.018 comprises some extra background information for an understanding of the technique presented herein. Additional information is given in the TS 23.727.

As has become apparent from the above description of exemplary embodiments, the technique presented herein avoids in certain configuration impacting the GMSC and legacy MSC in the network for CSFB and mobile terminating retry. It also allows for fast and cost efficient deployment of CSFB as an early LTE or other 4G solution.

Moreover, the technique presented herein may provide an enhanced RR solution that allows resolving an MSC-S mismatch due to a lacking congruency between TAs and LAs. The mismatch may as an option entirely be resolved within the visited network. The technique may be implemented using MSC-Ss that are anyway upgraded to support CSFB. Consequently, no GMSC upgrades are necessarily required because the GMSC is not impacted by the enhanced RR procedure in case of a terminating call and a CSFB situation. The present solution has minimal impact on the MSC-Ss in LAs close to or overlapping with TAs in E-UTRAN, and the update can also be limited to such MSC-Ss. In general, call set up delay can be reduced in particular in roaming situations. Moreover, it will be sufficient to upgrade the old MSC, the new MSC (as an option) and, in certain scenarios, the HLR.

It is believed that many advantages of the technique disclosed herein will be fully understood from the foregoing description, and it will be apparent that various changes may be made in the form, construction, and arrangement of the exemplary embodiments without departing from the scope of the invention, or without sacrificing all of its advantages. Because the technique presented herein can be varied in many ways, it will be recognized that the invention should be limited only by the scope of the claims that follow.

The invention claimed is:

1. A method of handling mobile terminating connection attempts for a mobile terminal for which a change of an association from a first mobile switching center (MSC) to a second MSC is accompanied by a Circuit Switched CS fallback, the method being carried out by the first MSC and comprising:

receiving a first mobile terminating connection attempt to the mobile terminal;

in response to receipt of the first mobile terminating connection attempt, determining that the mobile terminal cannot be reached by the first MSC;

determining an identity of the second MSC based on a mobile application part (MAP) Send_Identification message received by the first MSC from the second MSC; and transmitting, to the second MSC, a second mobile terminating connection attempt for a CS connection to the mobile terminal.

2. The method of claim 1, wherein the identity of the second MSC is given by a network address.

3. The method of claim 1, wherein the mobile terminal is registered in the first MSC via a dedicated interface to a mobility management node.

4. The method of claim 3, wherein the second MSC lacks the dedicated interface.

5. The method of claim 3, wherein the dedicated interface is a SGs interface and the mobility management node is a Mobility Management Entity, or MME.

6. The method of claim 1, wherein the second MSC lacks CS fallback support for the mobile terminal.

7. The method of claim 1, further comprising detecting, performing or triggering a CS fallback.

8. The method of claim 7, wherein detecting, performing or triggering the CS fallback results in or includes a dialog with the mobility management entity via a dedicated interface.

9. The method of claim 7, wherein the CS fallback is detected, performed or triggered based on at least one of:

receipt of a location update notification or a location cancellation notification for the mobile terminal;

determining that the mobile terminal cannot be reached; and receipt of a fallback notification from the second MSC.

10. The method of claim 1, wherein determining that the mobile terminal cannot be reached comprises at least one of:

paging the mobile terminal and determining that no paging response is received from the mobile terminal;

receiving a location update notification or a location cancellation notification for the mobile terminal; and receiving the MAP Send_Identification message from the second routing node.

11. The method of claim 1, wherein the identity of the second MSC is determined based on the MAP Send_Identification message.

12. The method of claim 11, wherein the MAP Send_Identification message comprises the identity of the second MSC.

13. The method of claim 11, wherein determining the identity of the second MSC comprises using the identity of the second MSC comprised in the MAP Send_Identification message.

14. The method of claim 1, wherein the identity of the second MSC is determined based on a predefined association between the first MSC and the second MSC.

15. The method of claim 1, wherein the identity of the second MSC is determined based on one or more area identifiers pertaining to the location of the mobile terminal.

16. The method of claim 15, wherein the one or more area identifiers are received together with the first mobile terminating connection attempt.

17. The method of claim 15, wherein the identity of the second MSC is determined based on a predefined mapping between area identifiers and second MSC.

18. The method of claim 1, further comprising requesting a roaming number for the mobile terminal from the second MSC once the identity of the second MSC has been determined.

19. The method of claim 18, further comprising:
  starting, in response to receipt of a location update notification or a location cancellation notification for the mobile terminal, a delay timer; and
  requesting the roaming number once the delay timer has expired.

20. The method of claim 18, further comprising sending the roaming number together with the second mobile terminating connection attempt to the second MSC.

21. The method of claim 1, wherein the first mobile terminating connection attempt is for a non-CS connection to the mobile terminal.

22. A method of handling a mobile terminating connection attempt for a mobile terminal for which a change of an association from a first mobile switching center (MSC) to a second MSC is accompanied by a Circuit Switched (CS) fallback, the method carried out by the second MSC and comprising:
  sending, to the first MSC, a mobile application part (MAP) Send_Identification message enabling the first MSC to determine an identity of the second MSC; and
  receiving, from the first MSC, a mobile terminating connection attempt for a CS connection to the mobile terminal.

23. The method of claim 22, wherein the MAP Send_Identification message is provided based on information received in a location update for the mobile terminal containing the identity of the first MSC.

24. A non-transitory computer-readable storage medium that stores computer-executable process steps for handling mobile terminating connection attempts for a mobile terminal for which a change of an association from a first mobile switching center (MSC) to a second MSC is accompanied by a Circuit Switched (CS) fallback, the computer-executable process steps causing the first MSC to perform the steps of:
  receiving a first mobile terminating connection attempt to the mobile terminal;
  in response to receipt of the first mobile terminating connection attempt,
  determining that the mobile terminal cannot be reached by the first MSC;
  determining an identity of the second MSC based on a mobile application part (MAP) Send_Identification message received by the first MSC node from the second MSC; and
  transmitting, to the second MSC, a second mobile terminating connection attempt for a CS connection to the mobile terminal.

25. A non-transitory computer-readable storage medium that stores computer-executable process steps for handling a mobile terminating connection attempt for a mobile terminal for which a change of an association from a first mobile switching center (MSC) to a second MSC is accompanied by a Circuit Switched, (CS) fallback, the computer-executable process steps causing the second MSC to perform the steps of:
  sending, to the first MSC, mobile application part (MAP) Send_Identification message enabling the first MSC to determine an identity of the second MSC; and
  receiving, from the first MSC, a mobile terminating connection attempt for a CS connection to the mobile terminal.

26. A mobile switching center (MSC) for handling mobile terminating connection attempt for a mobile terminal for which a change of an association from the MSC to another MSC is accompanied by a Circuit Switched, (CS) fallback, the MSC comprising:
  a processor operationally coupled to a memory, wherein the processor and memory are configured to:
    receive a first mobile terminating connection attempt to the mobile terminal;
    determine, in response to receipt of the first mobile terminating connection attempt, that the mobile terminal cannot be reached by the MSC;
    determine an identity of the other MSC; and
    transmit, to the other MSC, a second mobile terminating connection attempt for a CS connection to the mobile terminal, wherein the MSC is configured to determine the identity of the other MSC based on a mobile application part (MAP) Send_Identification message received by the MSC from the other MSC.

27. The MSC of claim 26, wherein the first mobile terminating connection attempt is for a non-CS connection to the mobile terminal.

28. A mobile switching center (MSC) for handling a mobile terminating connection attempt for a mobile terminal for which a change of an association from another MSC to the MSC is accompanied by a Circuit Switched (CS) fallback, the MSC comprising:
  a processor operationally coupled to a memory, wherein the processor and memory are configured to:
    send, to the other MSC, a mobile application part (MAP) Send_Identification message enabling the other MSC to determine an identity of the MSC; and
    receive, from the other MSC, a mobile terminating connection attempt for a CS connection to the mobile terminal.

29. The MSC of claim 28, wherein the processor and memory are further configured to provide the MAP Send_Identification message based on information received in a location update for the mobile terminal containing the identity of the other MSC.

30. A network system, comprising:
  a first mobile switching center (MSC) for handling mobile terminating connection attempt for a mobile terminal for which a change of an association from the first MSC to a second MSC is accompanied by a Circuit Switched (CS) fallback, the first MSC comprising:
    a first processor operationally coupled to a first memory, wherein the first processor and the first memory are configured to:
      receive a first mobile terminating connection attempt to the mobile terminal;
      determine, in response to receipt of the first mobile terminating connection attempt, that the mobile terminal cannot be reached by the first MSC;
      determine an identity of the second MSC; and
      transmit, to the second MSC, a second mobile terminating connection attempt for a CS connection to the mobile terminal, wherein the first MSC is configured to determine the identity of the second MSC based on a mobile application part (MAP) Send_Identification message received by the first MSC from the second MSC; and
  the second MSC comprising:
    a second processor operationally coupled to a second memory, wherein the second processor and the second memory are configured to:
      send, to the first MSC, the MAP Send_Identification message enabling the first MSC to determine the identity of the second MSC; and
      receive, from the first MSC, a mobile terminating connection attempt for a CS connection to the second mobile terminal.

31. The network system according to claim 30, wherein the network system is configured to support the Long Term Evolution standard.

* * * * *

UNITED STATES PATENT AND TRADEMARK OFFICE
CERTIFICATE OF CORRECTION

PATENT NO. : 9,161,268 B2  
APPLICATION NO. : 13/876092  
DATED : October 13, 2015  
INVENTOR(S) : Keller et al.

Page 1 of 1

It is certified that error appears in the above-identified patent and that said Letters Patent is hereby corrected as shown below:

In the Specification

In Column 3, Line 55, delete "Send_dentification" and insert -- Send_Identification --, therefor.

In Column 12, Line 63, delete "CMST" and insert -- CSMT --, therefor.

In the Claims

In Column 13, Line 60, in Claim 1, delete "CS" and insert -- (CS) --, therefor.

In Column 15, Line 43, in Claim 24, delete "MSC node" and insert -- MSC --, therefor.

In Column 15, Line 52, in Claim 25, delete "Switched," and insert -- Switched --, therefor.

In Column 15, Line 54, in Claim 25, delete "mobile" and insert -- a mobile --, therefor.

In Column 15, Line 63, in Claim 26, delete "Switched," and insert -- Switched --, therefor.

Signed and Sealed this  
Fifth Day of April, 2016

Michelle K. Lee  
*Director of the United States Patent and Trademark Office*